United States Patent [19]
Goto

[11] Patent Number: 5,612,069
[45] Date of Patent: Mar. 18, 1997

[54] APPARATUS FOR MANUFACTURING A LONG NON-CERAMIC INSULATOR IN A MOLD LONGITUDINALLY SHORTER THAN THE INSULATOR

[75] Inventor: Daisaku Goto, Konan, Japan

[73] Assignee: NGK Insulators, Ltd., Nagoya, Japan

[21] Appl. No.: 547,404

[22] Filed: Oct. 24, 1995

Related U.S. Application Data

[62] Division of Ser. No. 172,807, Dec. 27, 1993, Pat. No. 5,484,564.

[30]     Foreign Application Priority Data

Dec. 28, 1992   [JP]   Japan .................................... 4-347840

[51] Int. Cl.⁶ .................................................. B29C 45/44
[52] U.S. Cl. .................. 425/527; 264/318; 425/DIG. 58
[58] Field of Search ........................... 425/DIG. 58, 577; 264/318

[56]            References Cited

U.S. PATENT DOCUMENTS

| | | | |
|---|---|---|---|
| 2,949,636 | 8/1960 | Mastin | 425/DIG. 58 |
| 4,372,907 | 2/1983 | Herold et al. | 264/265 |
| 4,373,113 | 2/1983 | Winkler et al. | 174/179 |
| 4,466,692 | 8/1984 | Sonoda | 339/276 |
| 4,476,081 | 10/1984 | Kaczerginski et al. | 264/262 |
| 4,620,959 | 11/1986 | Goto et al. | 264/335 |
| 5,223,190 | 6/1993 | Vallauri et al. | 264/40.1 |
| 5,498,387 | 3/1996 | Carter et al. | 425/DIG. 58 |

FOREIGN PATENT DOCUMENTS

| | | | |
|---|---|---|---|
| 1130150 | 3/1962 | Germany | 425/DIG. 58 |
| 63-128916 | 6/1988 | Japan . | |

*Primary Examiner*—Tim Heitbrink
*Attorney, Agent, or Firm*—Ronald J. Kubovcik, Esq.

[57]              ABSTRACT

A method for manufacturing a long size non-ceramic insulator is provided. The method includes the first step, in which a rubber housing having a plurality of trunks and skirts is formed around a long size core while molds are tightly assembled, and 1 second, in which the long size core is moved a length corresponding to the rubber housing while the molds are separated. Further according to a third step, the long size core is set in a position in the molds as the distal portion of the formed rubber housing is clamped by positioning jigs disposed in the molds while the molds are tightly assembled. While the rubber housing is clamped, the next continuous rubber housing is formed around the long size core, which will be connected to the last formed rubber housing.

3 Claims, 6 Drawing Sheets

APPARATUS FOR MANUFACTURING A LONG NON-CERAMIC INSULATOR IN A MOLD LONGITUDINALLY SHORTER THAN THE INSULATOR

This is a division of application Ser. No. 08/172,087 filed Dec. 27, 1993 now U.S. Pat. No. 5,484,564

BACKGROUND OF THE INVENTION

1. Field of the Invention

The present invention relates generally to a method and apparatus for manufacturing non-ceramic insulators of the type having a plurality of trunks and skirts made from a rubbery material and formed around a fiber reinforced plastic core. More specifically, the present invention relates to a method and apparatus for manufacturing elongated non-ceramic insulator used in high voltage power lines.

2. Description of the Related Art

Non-ceramic insulators are often formed with a housing made from elastic insulating material such as silicone rubber molded around a fiber reinforced plastic rod. The rod is reinforced using a plurality of axially aligned fiber bundles which are placed around the plastic rod and treated with a penetrating synthetic resin. This construction produces a rod having great durability and tensile stress. The rubbery elastic insulating material such as silicone rubber, ethylene propylene rubber or the like is used to provide particularly good weather resistance. Non-ceramic insulators constructed in this fashion are particularly long lasting, light weight, and have a high mechanical strength.

Conventional methods of manufacturing non-ceramic insulators include placing the rod shaped core into a cavity of separable molds, and having a rubbery elastic insulating material injected into the cavity to form an insulator housing having a plurality of trunks and skirts which surrounds the insulator core. Japanese Unexamined Patent Publication No. 63-128916 discloses a typical apparatus for manufacturing a non-ceramic insulator.

FIG. 7 shows an apparatus for manufacturing a non-ceramic insulator utilizing a transfer mold method. An upper separable mold 52 is supported on four legs 51. A lower separable mold 53 is supported in the middle portion of legs 51 and is movable along the legs 51. The upper and lower mold 52, 53 include cavities 54, respectively. A molded rubber article or molding is formed by injecting the rubbery material into the cavities 54 of the tightly assembled upper and lower molds 52 and 53.

More particularly, as shown in FIG. 8, a space 56 for receiving a rubbery elastic material prior to the molding process is defined by a piston 57 and a wall in the rear portion of the lower mold 53. The cavities 54 are formed in the front portion of the upper and lower mold 52,53. Flange portions 55, provided at both sides of cavities 54, communicate with the space 56, via corresponding gates 58, respectively. During the molding process, a rubbery elastic material is first placed in the space 56. The lower mold 53 is then lifted by means of a hydraulic lift so as to form a tight fit against the upper mold 52. Heat is next used to soften the rubbery material which is injected into the cavities 54 through the gates 58 by means of piston 57 to form the non-ceramic insulator.

However, according to this transfer mold method, the effective length of the insulator housing is limited to approximately 2 meters. This is due, in part, to the size of manufacturing machines, mold sizing precision, and deflection limits of insulator cores. Nonetheless, some applications, such as ultra high voltage transmission lines, require insulator housings having lengths of over 5 meters. Individual transfer molded insulator housings therefore must be connected in series, by way of flanges, in order to form a sufficiently insulator suitable for use in applications such as with power lines designed for ultra high voltage transmission.

Unfortunately, conventional methods for serially coupling insulator housings together necessitate the use of costly insulator housing alignment techniques which are difficult to properly maintain, and which, if not meticulously maintained, tend to produce misaligned insulator housings. Moreover, since insulator coupling requires the use of flanges or the like for connecting the individual insulator housings, the insulative property of the connected housings is less than that of a unitary housing.

SUMMARY OF THE INVENTION

Accordingly, it is a primary objective of the present invention to provide an improved manufacturing method that permits the easy and accurate manufacture of continuously formed, long non-ceramic insulators.

It is another objective of the present invention to provide an improved manufacturing method which permits the formation of long non-ceramic insulators suitable for use with ultra high voltage power transmission lines.

It is yet another objective of the present invention to provide an improved apparatus for manufacturing a long size non-ceramic insulator.

To achieve the foregoing and other objects and in accordance with the purpose of the present invention, an improved manufacturing method for manufacturing long insulators is provided according to a multi-step manufacturing process. In the first step, an insulator made from a rubber material and having a plurality of trunks and skirts is formed around a long size core by injecting a rubbery elastic insulating material into a first separable mold comprised of a plurality of casing segments and positioning jigs. In the second step, the insulator formed in the first step is separated from the inner longitudinal cavity of the first mold and moved a distance corresponding to the length of the newly formed insulator to a second mold where it is positioned according to various positioning jigs and fitting pieces. Further, according to the present invention, the first and second manufacturing steps are repeatedly carried out to form a long size insulator.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings, in which:

FIGS. 4 through 6 illustrate an apparatus for manufacturing a non-ceramic insulator, wherein:

FIG. 1 is a cross-sectional view illustrating a manufacturing step for forming the first rubber housing using a manufacturing apparatus according to the present invention;

FIG. 2 is a cross-sectional view illustrating the connecting operation during which a successive rubber housing is connected to the first rubber housing by means of the apparatus of FIG. 1;

FIG. 3 is a cross-sectional view illustrating the manufacturing step for forming the last rubber housing by means of the manufacturing apparatus of FIG. 1;

FIG. 4 is a front view of anti-displacement jigs disposed in the manufacturing apparatus in FIG. 1;

FIG. 5 is a cross-sectional view taken along the line 4—4 shown in FIG. 4;

FIG. 6 is a cross-sectional side view illustrating positioning jigs disposed in FIG. 1;

DETAILED DESCRIPTION OF THE PREFERRED EMBODIMENT

A preferred embodiment according to the present invention will now be described with reference to the accompanying drawings.

Figure 1:
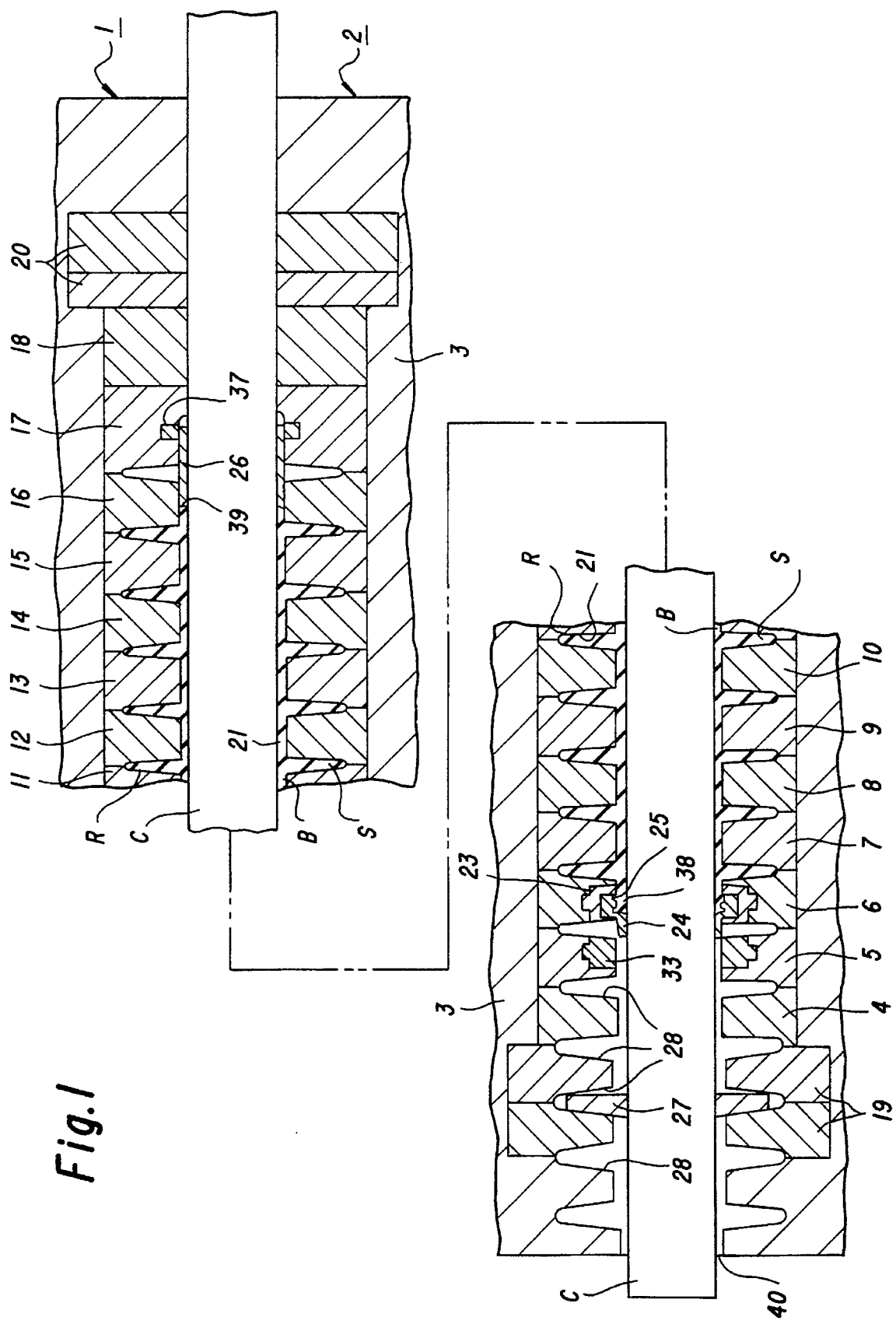
FIGS. 1 through 3 illustrate a method for manufacturing a non-ceramic insulator according to an embodiment of the present invention.
Figure 2:
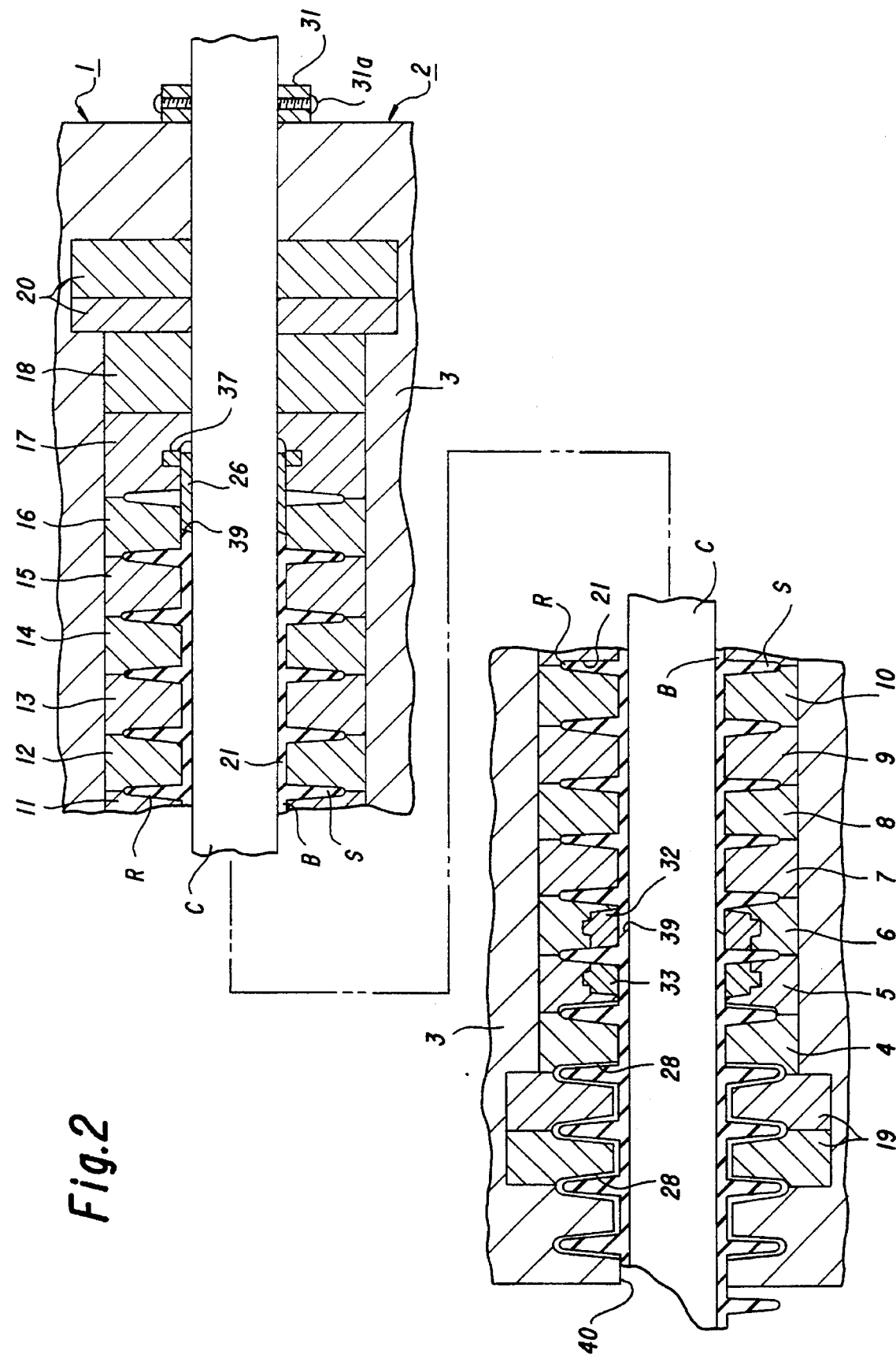
Figure 3:
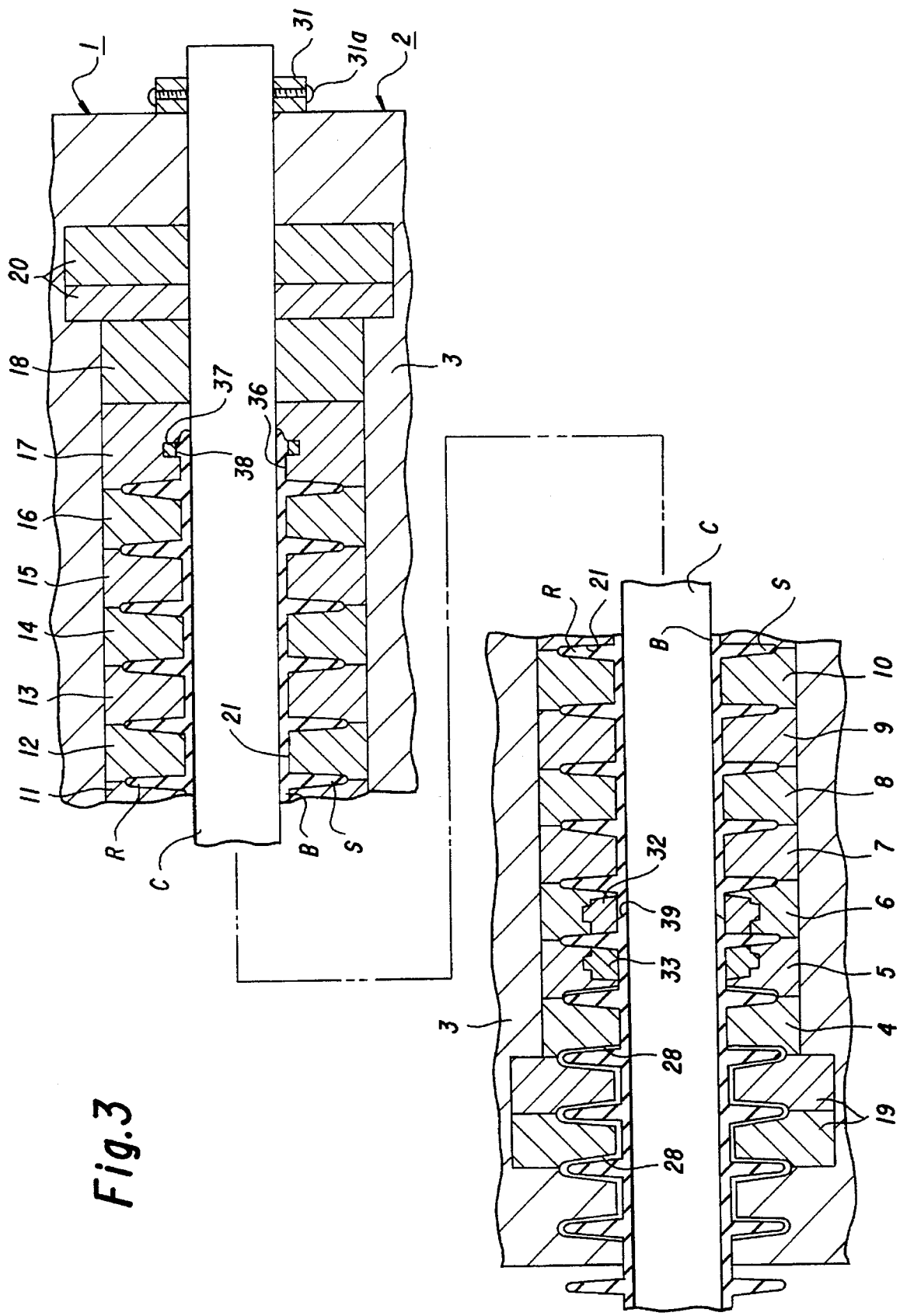

As shown in FIGS. 1 through 3, a molding apparatus includes an upper separable mold 1 and a lower separable mold 2 both of which have a similar structure. Both molds 1, 2 include casings 3 and a plurality of segments 4 through 18. Each segment is composed of two portions fittingly engaged in each casing 3 by fitting pieces 19, 20 secured to each casing by means of bolts (not shown).

When both molds 1,2 are assembled, the inner peripheral surface of segments 4–18 form a longitudinal corrugated cavity. A rubbery elastic insulating material is injected into the annular shaped cavities 21 through gates (not shown) disposed at the tip portions of the annular cavities 21. Once the rubbery elastic material has been fully injected into the mold and cured, the molded insulator housing R will contain skirts S and trunks B corresponding to the longitudinally shaped corrugated cavity of the mold as defined by the inner peripheral surface of segments 4–18. Prior to assembling the molds 1, 2, a core C is positioned between the molds. Core C is held in place after molds 1, 2 are assembled by means of a jig 27 (described below). Typically, core C is made of a fiber reinforced plastic (hereinafter referred to as FRP) or an epoxy resin and ethylene-propylene-diene copolymerized rubber (hereinafter EPDM).

Specifically, in reference to FIG. 1, when the first rubber insulator housing R is formed around the core C, a jig 23 for forming a head portion $i_F$ fittingly formed within the inner periphery of the segment 6. A portion of the jig 23 aligned with and adjacent to segment 6 defines a segment of the inner peripheral surface of the mold's corrugated cavity. The jig 23 includes a head collar 24 integrally formed with jig 23 in such a way that one end of collar 24 projects beyond the inner peripheral surface formed by jig 23 and collar 24 to align and contact core C. The inner peripheral surface of collar 24 also comprises a corrugated surface contiguous with the projecting portion of the collar 24. This corrugated surface is formed with a diameter greater than that of the projecting portion so that, in conjunction with core C, the collar 24 effectively defines a head portion of the molded insulator housing R. The inner corrugated surface of the collar 24 forms a ribbed and grooved portion thereof so that when housing R is formed, at least one groove 25 and ribs 38 may be formed at the head of the insulator housing. A holder 28 is provided that has a shape conforming to the contour of the cavity formed by inner peripheral surfaces fitting pieces 19, and operates to hold the head portion of the core C. Thus, the core C is securely held in place during the molding process allowing skirts S and trunks B to be accurately formed.

A tail end of the initial rubber housing R is formed at surfaces provided by the segment 16 and by a sleeve 26. The segment 17, unlike the segments 6–16, is integrally formed in one piece and has a ring shape flange at one end which provides alignment for core C. Fitted within segment 17 is a collar 37 which, according to the invention at this step in the molding process, supports the sleeve 26 placed over core C. Sleeve 26 supports and aligns core C with abutting support from segments 16 and 17. In this way, during the initial formation of housing R, the tail portion thereof is molded by the angular shape of sleeve 26 to produce a slanting connecting tail surface 39 for attachment with a head portion of a later formed portion of housing R. This construction further eliminates the possibility for the formation of any annular projections from the trunk portion of the tail portion of the molded housing R.

Figure 4:
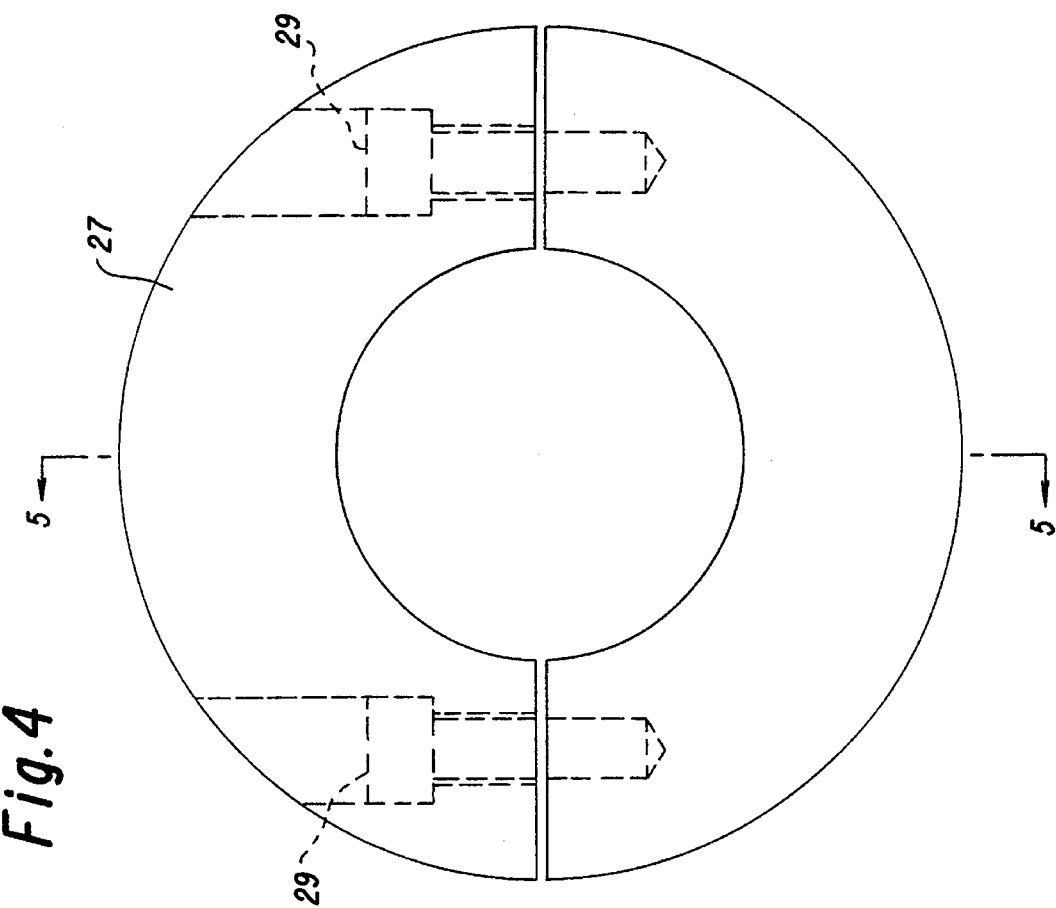
Figure 5:
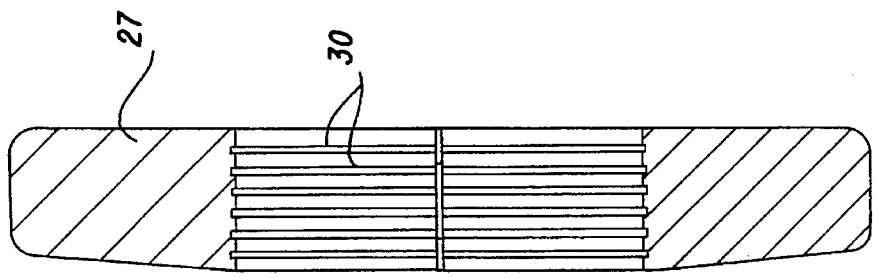

A jig 27 for preventing the core C from moving is disposed at the head portion of the core C. The jig 27 engages with the holder 28 shown disposed at the left side of FIG. 1. The core C is non-movably secured to the molds 1, 2 by means of the jig 27. As the first rubber housing R is to be formed, the jig 27 prevents the core from moving when the rubbery material is injected. As shown in FIGS. 4 and 5, the jig 27 is formed with two semi-circular split rings, and both rings are joined by means of bolts 29. A plurality of grooves are formed in the inner peripheral surface of the rings for securely clamping the core c.

The next process of the present invention, the molding of a successive rubber housing onto the first housing, is illustrated as shown in FIG. 2. At the end of the molding process of the first insulator housing R, following the separation of mold 1,2 and the removal of the molded rubber insulator housing from the inner surface of the mold, the entire rubber insulator is moved in a longitudinal direction corresponding to the relative lengths of the separated mold halves 1,2, and the molded insulator housing R. During the time when the mold halves are separated, a jig 32 as shown in FIG. 2 replaces jig 23 and collar 24 illustrated in FIG. 1. The direction of the core's repositioning movement, is from the right to the left, with reference to FIGS. 1 and 2. Where, the cavity has an opening 40 at the end portions of the mold 1,2 for holding the end portions of the first housing.

Following the repositioning of the initial insulator housing R, as well as the assembling and closing of mold halves 1 and 2, a stop ring 31 is mounted on the core C by means of screws 31a at a location where the right end surfaces of molds 1, 2 meet. This allows for the ring 31 to securely fasten the right tail surface of core C at the tail end of molds 1 and 2. Core C is thus prevented from moving longitudinally within the mold casings 1,2. After the repositioning of core C and newly formed housing R, the tail portion of the previous and first formed rubber housing R is clamped by the left head portions of the molds 1 and 2, according to the illustration shown in FIG. 2. A jig 32, is substituted in place of the jig 23, to form a continuous molding surface with segment 6. This surface defines the position where a new head portion of a continuously cast housing R is joined in the second molding process to the tail section 39 of the housing R cast in the previous molding session as shown in FIG. 2.

Figure 6:
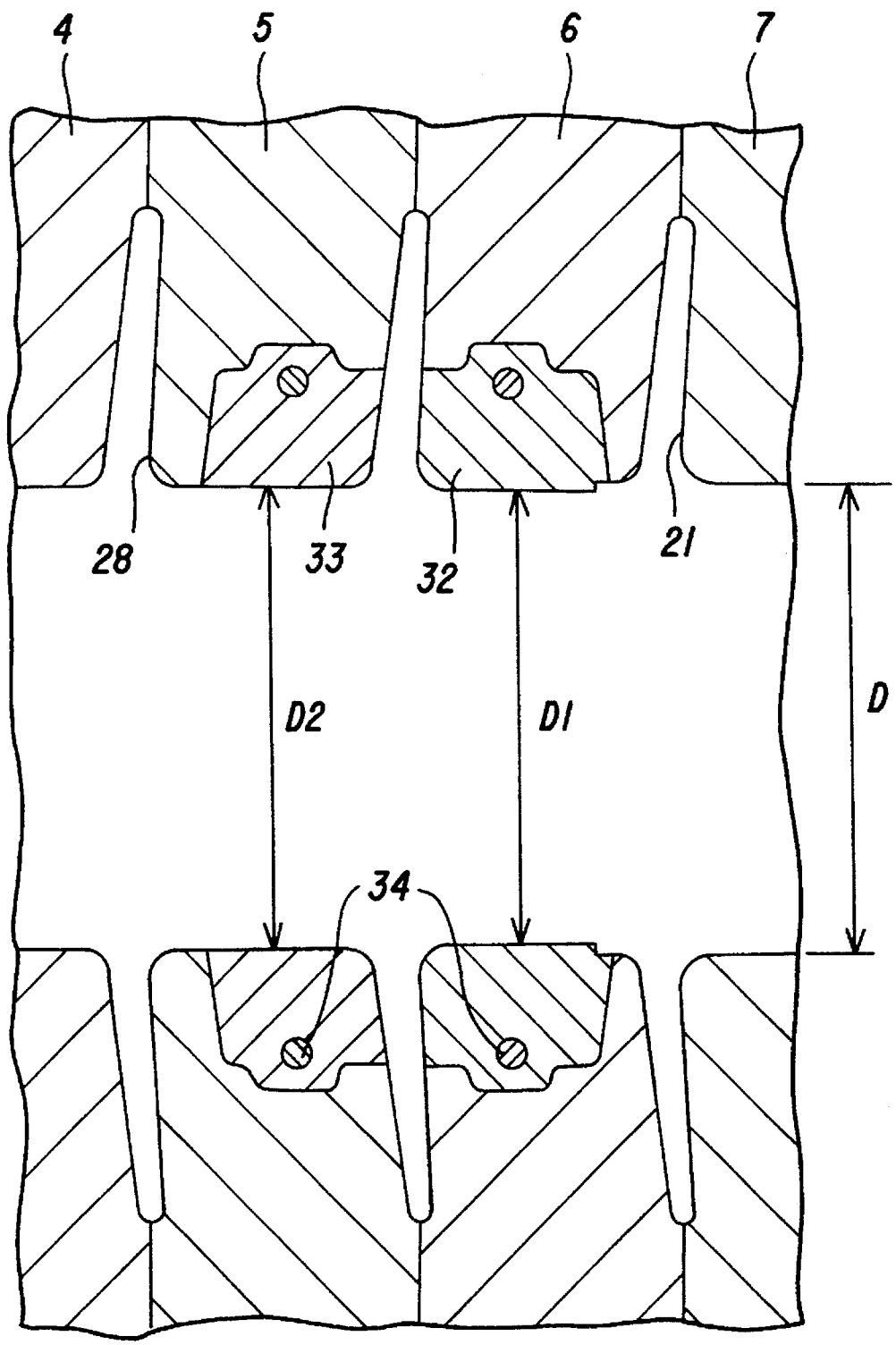
Figure 7:
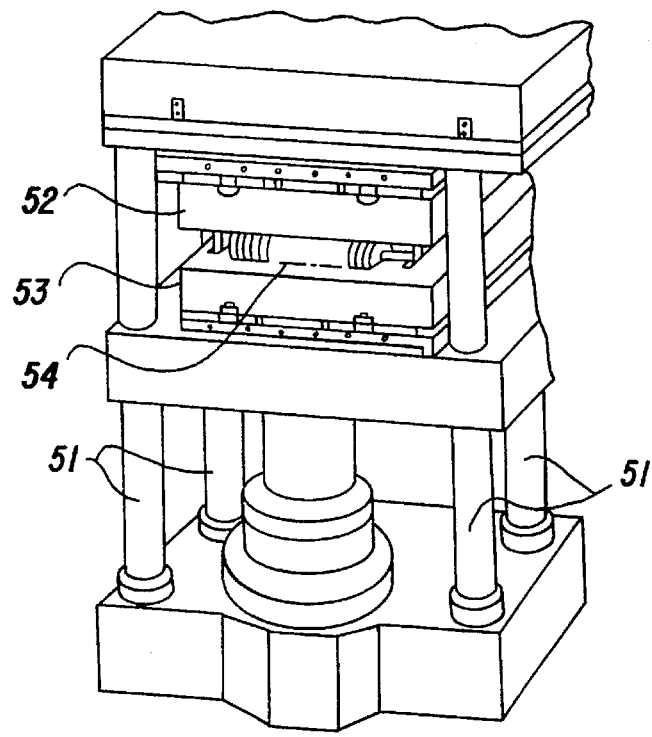
FIG. 7 is a perspective view of a conventional molding apparatus.
Figure 8:
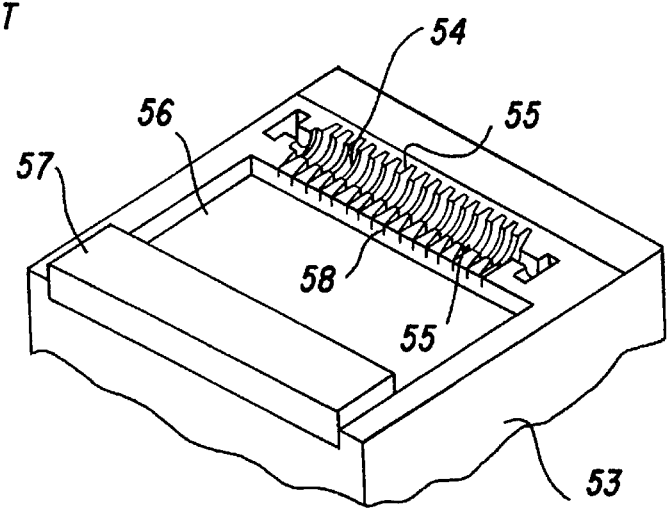
FIG. 8 is a perspective view of mold used in the conventional molding apparatus.

Prior to the second molding process, the diameter of the adjoined portions of the housing R must be carefully chosen to account for any differential contraction or expansion between the previously molded tail portion and the newly molded and adjoining head portion of the second molded housing R. This is illustrated as shown in FIG. 6 where inner diameters D1, D2 of the jigs 32, 33 are such as to prevent the tail portion of the formed rubber housing R from being deformed due to the pressure of the injected rubbery material.

Diameter D1, as illustrated, is set smaller than diameter D of the segment 7, the surface of which is used to adjoin the head portion of the successive rubber housing R. Diameter D2 is equal to or slightly larger than that of the diameter D1, and is set smaller than the inner diameter D of the segment 7. Expressed in a relational inequality, $D1 \leq D2 < D$. The jigs 32, 33 of the upper mold 1 and the jigs 32, 33 of the lower mold 2 are secured by way of knock pins 34 that are employed for securely maintaining their positions.

The molding process according to the second step is carried out, with changes being made only to the jigs in the head portion of the molds 1,2. The jigs in the tail portion of the molds 1,2 remain unchanged between first and second molding procedures, according to the this embodiment of the invention. Once the core C and first molded section of housing R are repositioned, molds 1,2 are joined, and material such as EPDM is injected around the FRP. In this way, the slanted tail section 39 of the previously formed housing R is joined to the newly formed head section produced in the second molding process. Following this second molding process, molds 1 and 2 are separated, and the newly formed housing R is removed and repositioned in a fashion similar to that previously done after the first molding.

As shown in FIG. 3, when the final rubber housing R is to be formed, the sleeve 26 is removed from the core C. The inner peripheral surface of segment 17 contains a groove 36 at the tail end of molds 1 and 2 that serves as the casting surface for the tail portion of the rubber housing R. A split tail collar jig 37 is fittingly inserted in integrally formed segment 17 and provides a corrugated molding surface contiguous with the inner surface of groove 36. The corrugated molding surface of jig 37 is provided with a plurality of ribs and at least one groove to allow for the secure clamping fit of an end fitting piece over the tail portion of insulator housing R.

The operations of separating, and assembling the molds 1, 2, and moving the core C are repeatedly carried out for any particular required number of times in order to form the continuous rubber housing R around the core C. The particular number of times the process is carried out will be determined based on the size of the mold. For example, if the mold length is 1 meter and a housing length of 3 meters is desired, the number of times with which the process should be carried out would be 3 times. According to the present embodiment of the invention, it is envisioned that common lengths for such insulator housings is between two and fifteen meters. For example, about 12 meters length is required for insulators which are utilized for 1000 kV line. When the final rubber housing R is to be formed, as shown in FIG. 3, the sleeve 26 is removed from the core C and the final end portion of the rubber housing R is formed by the inner surface grooves 36 of the segment 17. As the formed insulator is removed from the molds 1, 2, the excessive portions at both ends of the core C are cut accordingly to the required its length. The final operation such as the removing burr is applied to the formed insulator, in order to complete the operation of forming a non-ceramic insulator.

From the above description, since a continuous rubber housing can be formed around a single core and moved a predetermined distance during consecutive molding operations, a long size insulator can be easily formed by employing short size molds. This allows manufacturing costs to be maintained or reduced to a minimum. Furthermore, according to the present invention, since a straight unitary non-ceramic insulator can be easily made, metal flanges connecting short housing units together to form one long housing are no longer required. Thus, a non-ceramic insulator housing is capable of being made which has superior insulation ability.

As the head portion forming jig and the positioning jig are interchangeable, the continuous rubber housing can be formed on the long size core by employing only one set of short size molds. Further, deformation and damages to the adjoining head and tail portions of the rubber housing can be avoided.

Although only one embodiment of the present invention has been described in detail herein, it should be apparent to those skilled in the art that the present invention may be embodied in many other specific forms without departing from the spirit or scope of the invention. Particularly, it should be understood that the following modes are applied.

For example, the length of inner diameter D1 of the positioning jig 32 with respect to that of inner diameter D of the segment 7 can be varied according to the kinds of rubbery material or the conditions for forming thereof, or changing the forming shape by varying the thickness of the positioning jigs 32, 33. The shapes and structures of parts used in the manufacturing apparatus can be varied.

Therefore, the present examples and embodiments are to be considered as illustrative and not restrictive and the invention is not to be limited to the details given herein, but may be modified within the scope of the appended claims.

What is claimed is:

1. A non-ceramic insulator molding apparatus for molding an insulator housing having trunks and skirts around a long size core, said apparatus comprising:

a pair of separable molds having a cavity for forming said insulator housing, said cavity having an opening at end portions of said molds for holding end portions of said housing;

a first jig for forming a head portion of said housing;

a second jig for positioning a long size core and for clamping one of said end portions of said housing, said first and second jigs being removable from said mold; and a sleeve having a slanted surface for forming a connecting portion at a tail portion of said housing.

2. A molding apparatus according to claim 1, wherein the first jig for forming a head portion has at least one ridge and at least one groove formed on an inner peripheral surface thereof for forming at least one rib and at least one groove on the insulator housing.

3. A molding apparatus according to claim 1, wherein said cavity is formed by a plurality of mold segments fittingly secured within said cavity.

* * * * *